(12) United States Patent
Choe et al.

(10) Patent No.: US 8,110,298 B1
(45) Date of Patent: Feb. 7, 2012

(54) MEDIA FOR HIGH DENSITY PERPENDICULAR MAGNETIC RECORDING

(75) Inventors: Gunn Choe, San Jose, CA (US); B. Ramamurthy Acharya, Fremont, CA (US); Min Zheng, Milpitas, CA (US); E. Noel Abarra, Santa Clara, CA (US)

(73) Assignee: Seagate Technology LLC, Cupertino, CA (US)

( * ) Notice: Subject to any disclaimer, the term of this patent is extended or adjusted under 35 U.S.C. 154(b) by 816 days.

(21) Appl. No.: 11/367,821

(22) Filed: Mar. 3, 2006

Related U.S. Application Data

(60) Provisional application No. 60/658,904, filed on Mar. 4, 2005.

(51) Int. Cl.
G11B 5/66 (2006.01)

(52) U.S. Cl. .................................................. 428/827

(58) Field of Classification Search ........ 428/800–848.9
See application file for complete search history.

(56) References Cited

U.S. PATENT DOCUMENTS

| | | | |
|---|---|---|---|
| 4,251,842 A | 2/1981 | Iwasaki et al. | |
| 4,404,609 A | 9/1983 | Jones, Jr. | |
| 4,442,159 A | 4/1984 | Dezawa et al. | |
| 4,567,083 A | 1/1986 | Arioka et al. | |
| 4,636,448 A | 1/1987 | Morita et al. | |
| 4,642,270 A | 2/1987 | Morita et al. | |
| 4,643,942 A | 2/1987 | Ohtsubo et al. | |
| 4,649,073 A | 3/1987 | Suzuki et al. | |
| 4,652,479 A | 3/1987 | Suzuki et al. | |
| 4,656,546 A | 4/1987 | Mallory | 360/110 |
| 4,731,300 A | 3/1988 | Watanabe et al. | |
| 4,743,491 A | 5/1988 | Asada et al. | |
| 4,748,525 A | 5/1988 | Perlov | 360/110 |
| 4,763,215 A | 8/1988 | Gueugnon et al. | |
| 4,767,516 A | 8/1988 | Nakatsuka et al. | |
| 4,982,301 A | 1/1991 | Endo | |
| 5,094,925 A | 3/1992 | Ise et al. | |
| 5,196,976 A | 3/1993 | Lazzari et al. | |
| 5,204,193 A | 4/1993 | Sato et al. | |
| 5,224,080 A | 6/1993 | Ohtsuki et al. | |
| 5,325,343 A | 6/1994 | Ohtsuki et al. | |
| 5,329,413 A | 7/1994 | Kondoh et al. | |
| 5,343,449 A | 8/1994 | Miyata et al. | |
| 5,347,485 A | 9/1994 | Taguchi et al. | |
| 5,486,967 A | 1/1996 | Tanaka et al. | |

(Continued)

FOREIGN PATENT DOCUMENTS

JP 11 283 230 A 10/1999

(Continued)

OTHER PUBLICATIONS

Muraoka et al.; "Analysis on Magnetization Transition of CGC Perpendicular Media"; IEEE Transactions of Magnetics, vol. 38, No. 4, Jul. 2002.

(Continued)

Primary Examiner — Holly Rickman
Assistant Examiner — Linda Chau
(74) Attorney, Agent, or Firm — Hollingsworth & Funk, LLC

(57) ABSTRACT

Perpendicular magnetic recording media having a magnetic capping layer that is exchange coupled to an underlying perpendicular magnetic recording layer. The magnetic coupling layer is a granular layer having a high saturation magnetization ($M_s$). The perpendicular magnetic recording layer can include magnetic grains separated by an oxide grain boundary phase.

25 Claims, 5 Drawing Sheets

U.S. PATENT DOCUMENTS

| | | | |
|---|---|---|---|
| 5,525,398 A | 6/1996 | Takai et al. | |
| 5,567,523 A | 10/1996 | Rosenblum et al. | |
| 5,636,093 A | 6/1997 | Gijs et al. | |
| 5,640,374 A | 6/1997 | Hirokane et al. | |
| 5,644,566 A | 7/1997 | Nakayama et al. | |
| 5,659,537 A | 8/1997 | Hirokane et al. | |
| 5,703,795 A | 12/1997 | Mankovitz | |
| 5,830,569 A | 11/1998 | Hikosaka et al. | 428/332 |
| 5,981,054 A | 11/1999 | Hikosaka et al. | |
| 6,117,011 A | 9/2000 | Lvov et al. | |
| 6,174,597 B1 | 1/2001 | Yusu et al. | |
| 6,183,893 B1 | 2/2001 | Futamoto et al. | 428/694 |
| 6,280,813 B1 | 8/2001 | Carey et al. | |
| 6,292,329 B1 | 9/2001 | Sato et al. | |
| 6,327,227 B1 | 12/2001 | Katayama et al. | |
| 6,430,115 B1 | 8/2002 | Hirokane et al. | |
| 6,447,936 B1 | 9/2002 | Futamoto et al. | |
| 6,468,670 B1 | 10/2002 | Ikeda et al. | |
| 6,495,252 B1 | 12/2002 | Richter et al. | |
| 6,500,530 B1 | 12/2002 | Sawamura et al. | |
| 6,528,149 B2 | 3/2003 | Yoshida et al. | |
| 6,534,203 B2 | 3/2003 | Iwasaki et al. | |
| 6,602,612 B2 | 8/2003 | Abarra et al. | |
| 6,602,621 B2 | 8/2003 | Matsunuma et al. | |
| 6,686,070 B1 | 2/2004 | Futamoto et al. | |
| 6,687,067 B2 | 2/2004 | Brianti et al. | |
| 6,699,600 B2 | 3/2004 | Shimizu et al. | |
| 6,707,643 B2 | 3/2004 | Takeo et al. | |
| 6,713,197 B2 | 3/2004 | Nakamura et al. | |
| 6,716,516 B2 | 4/2004 | Futamoto et al. | |
| 6,723,450 B2 | 4/2004 | Do et al. | |
| 6,723,457 B2 | 4/2004 | Tanahashi et al. | |
| 6,754,020 B1 | 6/2004 | Hikosaka et al. | 360/59 |
| 6,759,148 B2 | 7/2004 | Tanahashi et al. | |
| 6,777,112 B1 | 8/2004 | Girt et al. | |
| 6,794,028 B2 | 9/2004 | Uwazumi et al. | |
| 6,815,082 B2 | 11/2004 | Girt | |
| 6,830,824 B2 | 12/2004 | Kikitsu et al. | |
| 6,846,583 B2 | 1/2005 | Inaba et al. | |
| 6,866,948 B2 | 3/2005 | Koda et al. | 428/694 |
| 6,875,492 B1 | 4/2005 | Pirzada et al. | 428/65.5 |
| 6,881,497 B2 | 4/2005 | Coffey et al. | |
| 6,884,520 B2 | 4/2005 | Oikawa et al. | 428/611 |
| 6,890,667 B1 | 5/2005 | Lairson et al. | |
| 6,899,959 B2 | 5/2005 | Bertero et al. | |
| 6,942,936 B2 | 9/2005 | Oikawa et al. | |
| 7,056,605 B2 | 6/2006 | Kawada | |
| 7,060,375 B2 | 6/2006 | Lee et al. | |
| 7,070,870 B2 | 7/2006 | Bertero et al. | |
| 7,105,239 B2 | 9/2006 | Oikawa et al. | |
| 7,138,194 B2 | 11/2006 | Shimizu et al. | |
| 7,144,640 B2 | 12/2006 | Hee et al. | |
| 7,153,546 B2 | 12/2006 | Tanahashi et al. | |
| 7,166,376 B2 | 1/2007 | Hikosaka et al. | |
| 7,169,488 B2 | 1/2007 | Chen et al. | |
| 7,183,011 B2 | 2/2007 | Nakamura et al. | |
| 7,192,664 B1 | 3/2007 | Wu et al. | |
| 7,226,674 B2 | 6/2007 | Koda et al. | |
| 7,232,620 B2 | 6/2007 | Inomata | |
| 7,261,958 B2 | 8/2007 | Hirayama et al. | |
| 7,311,983 B2 | 12/2007 | Watanabe et al. | |
| 7,330,335 B2 | 2/2008 | Kikitsu et al. | |
| 7,332,194 B2 | 2/2008 | Takenoiri et al. | |
| 7,368,185 B2 | 5/2008 | Hirayama et al. | |
| 7,384,699 B2 | 6/2008 | Nolan et al. | |
| 7,470,474 B2 | 12/2008 | Sakawaki et al. | |
| 7,635,498 B2 | 12/2009 | Sakai et al. | |
| 7,678,476 B2 | 3/2010 | Weller et al. | |
| 7,736,765 B2 | 6/2010 | Wu et al. | |
| 2001/0051287 A1* | 12/2001 | Kikitsu et al. | 428/694 ML |
| 2002/0018917 A1 | 2/2002 | Sakai et al. | |
| 2003/0017369 A1 | 1/2003 | Hirayama et al. | |
| 2003/0022025 A1 | 1/2003 | Futamoto et al. | 428/694 |
| 2003/0064249 A1 | 4/2003 | Uwazumi et al. | 428/694 |
| 2003/0082410 A1* | 5/2003 | Sato et al. | 428/694 EC |
| 2003/0099869 A1 | 5/2003 | Oikawa et al. | |
| 2003/0104247 A1* | 6/2003 | Girt | 428/693 |
| 2003/0108721 A1 | 6/2003 | Fullerton et al. | |
| 2003/0152805 A1 | 8/2003 | Bertero et al. | |
| 2003/0180577 A1 | 9/2003 | Do et al. | |
| 2003/0215675 A1 | 11/2003 | Inaba et al. | |
| 2004/0023074 A1 | 2/2004 | Shimizu et al. | |
| 2004/0027868 A1 | 2/2004 | Nakamura et al. | 365/199 |
| 2004/0033390 A1 | 2/2004 | Oikawa et al. | |
| 2004/0057156 A1* | 3/2004 | Lee et al. | 360/135 |
| 2004/0086753 A1 | 5/2004 | Inomata | |
| 2004/0110034 A1 | 6/2004 | Kawada | |
| 2004/0185306 A1 | 9/2004 | Coffey et al. | |
| 2004/0185308 A1 | 9/2004 | Koda et al. | |
| 2004/0219329 A1 | 11/2004 | Oikawa et al. | |
| 2004/0224184 A1 | 11/2004 | Hikosaka et al. | 428/694 |
| 2005/0014029 A1 | 1/2005 | Takenoiri et al. | 428/694 |
| 2005/0019608 A1 | 1/2005 | Kim et al. | |
| 2005/0041335 A1 | 2/2005 | Kikitsu et al. | |
| 2005/0084715 A1 | 4/2005 | Hee et al. | 428/694 |
| 2005/0129984 A1 | 6/2005 | Bertero et al. | |
| 2005/0142378 A1 | 6/2005 | Nemoto et al. | |
| 2005/0142388 A1 | 6/2005 | Hirayama et al. | |
| 2005/0186358 A1 | 8/2005 | Sakai et al. | 427/548 |
| 2006/0139799 A1 | 6/2006 | Wu et al. | |
| 2006/0204791 A1 | 9/2006 | Sakawaki et al. | |
| 2006/0246323 A1 | 11/2006 | Liu et al. | |
| 2007/0064345 A1 | 3/2007 | Nolan et al. | |
| 2007/0172705 A1 | 7/2007 | Weller et al. | |
| 2008/0144213 A1 | 6/2008 | Berger et al. | |
| 2009/0068500 A1 | 3/2009 | Kong et al. | |
| 2010/0020441 A1 | 1/2010 | Wu et al. | |

FOREIGN PATENT DOCUMENTS

| | | |
|---|---|---|
| JP | 2001344725 | 12/2001 |
| JP | 2003 168207 | 6/2003 |
| KR | 1020040025430 A | 3/2004 |
| WO | 2004/090874 A1 | 10/2004 |

OTHER PUBLICATIONS

Brandle et al., "Optical and Magneto-Optical Characterization of Evaporated Co/Pt Alloys and Multilayers," IEEE Trans. Mag., 28(5), Sep. 1992, pp. 2967-2969.

Zhang et al., "Pt layer thickness dependence of magnetic properties in Co/Pt multilayers," J. App. Phys, 69(8), Apr. 1991, pp. 5649-5651.

Ashar, "Future Trends in Technology," Chapter 11 in *Magnetic Disk Drive Technology: Heads, Media, Channel, Interfaces and Integration*, IEEE Press: New York NY, pp. 306-333, 1997.

Written Opinion of related Singapore Application No. SG 200606515-5 dated Mar. 27, 2007 (11 pgs).

Office Action from U.S. Appl. No. 11/231,796, dated Apr. 1, 2010, 9 pp.

Response to Office Action dated Apr. 1, 2010, from U.S. Appl. No. 11/231,796, filed Jun. 1, 2010, 5 pp.

Response to Office Action dated Apr. 1, 2010, and Advisory Action dated Jun. 15, 2010, from U.S. Appl. No. 11/231,796, filed Jul. 1, 2010, 8 pp.

File history for U.S. Appl. No. 11/231,796, 328 pages.
File history for U.S. Appl. No. 12/769,551, 113 pages.
File history for U.S. Appl. No. 12/180,093, 146 pages.
File history for U.S. Appl. No. 11/022,810, 91 pages.

* cited by examiner

MEDIA FOR HIGH DENSITY PERPENDICULAR MAGNETIC RECORDING

CROSS-REFERENCE TO RELATED APPLICATIONS

This patent application claims priority under 35 U.S.C. §119(e) from U.S. Provisional Patent Application Ser. No. 60/658,904 entitled "CoPtCrO COMPOSITE MEDIA FOR HIGH DENSITY PERPENDICULAR RECORDING," filed on Mar. 4, 2005, the entire disclosure of which is incorporated herein by reference in its entirety.

BACKGROUND OF THE INVENTION

1. Field of the Invention

The present invention is directed to a perpendicular magnetic recording medium. In particular, the present invention is directed to a perpendicular magnetic recording medium that includes a structurally discontinuous magnetic capping layer over a perpendicular magnetic recording layer for improved magnetic recording properties, including an increased signal-to-noise ratio (SNR), improved thermal stability and reduced transition jitter.

2. Description of Related Art

Thin film magnetic recording media are composed of multiple layers, including one or more magnetic recording layers, disposed on a substrate. Traditionally, the magnetic recording layer includes small magnetic grains that have an easy magnetization axis that is magnetically oriented longitudinally (i.e., in plane) with respect to the magnetic layer.

The areal density of longitudinal magnetic recording media has been increasing at a compounded growth rate of about 60% per year and areal densities as high as 100 gigabits per square inch (Gbit/in$^2$) have been demonstrated. Scaling longitudinal recording media to higher areal densities requires smaller magnetic grains. However, as the grain size is reduced, thermal fluctuations can cause the magnetic domains to "flip", causing a loss of magnetization over a period of time. Media having a higher magnetic coercivity and an increased track density (tracks per inch, or TPI) can mitigate this problem. However, the large write head gaps that are needed for good overwrite of high coercivity media lead to excessive fringing, negatively affecting the data written on adjacent tracks.

Perpendicular (vertical) magnetic recording media have been proposed as a way to increase areal densities beyond 100 Gb/in$^2$ Perpendicular magnetic recording media include a magnetic recording layer having an easy magnetization axis that is substantially perpendicular to the magnetic layer. A perpendicular write head, such as a monopole write head or a shielded pole write head, is utilized to magnetize the grains in the perpendicular recording layer. Examples of perpendicular recording media and perpendicular write heads are disclosed in U.S. Pat. No. 4,656,546 by Mallary and U.S. Pat. No. 4,748,525 by Perlov, which are incorporated herein by reference in their entirety.

Oxygen-doped magnetic alloys are promising materials for use as the hard magnetic recording layer in perpendicular magnetic recording media. CoPtCrO is an example of an oxygen-doped magnetic alloy that can be fabricated with small grains having good magnetic decoupling and good thermal stability. Magnetic layers made from CoPtCrO include magnetic grains of Co separated by a non-magnetic oxide phase that preferentially segregates to the grain boundaries.

It is desirable to form a magnetic recording layer with a high magnetic anisotropy ($K_u$), which is a measure of the magnetic stability of the grains. However, the fabrication of well-isolated Co grains with high anisotropy is difficult because the magnetic grain size, as well as the degree of grain boundary segregation, is highly dependent upon the level of oxidation. At high oxidation levels, the oxygen can incorporate into the Co grain, resulting in reduced anisotropy. Moreover, variations in the degree of grain boundary segregation within the magnetic layer result in a distribution of exchange fields and magnetic cluster size, which increases transition jitter.

Transition jitter is a major component of medium noise, which is a limiting factor in increasing the recording density of magnetic recording media. In magnetic media, transition jitter arises at the junctions between zones of opposite magnetic orientation. At these junctions, the magnetic orientation transitions are recorded at the edge of the magnetic units that make up the medium, i.e., at the edge of the grains. However, the magnetic grain edges are not aligned along a straight line. As a result, the magnetic transitions do not occur abruptly and local deviations of magnetization from the intended transition center are present.

Coupled granular/continuous (CGC) media have been proposed to improve transition jitter through transition smoothing. Specifically, exchange-coupled continuous (i.e., amorphous) films such as Co—Pt, TbCoPr, TbCo and Pt-rich CoPtCr have been used as continuous layers over an underlying granular magnetic film to magnetically pin the magnetic grains.

Muraoka et al., "Analysis on Magnetization Transition of CGC Perpendicular Media," IEEE Transactions On Magnetics, Vol. 38, No. 4, July 2002, discloses the use of CGC media to improve transition jitter through transition smoothing. The CGC media disclosed by Muraoka et al. include a first layer of granular CoCrPt having a magnetically isolated grain structure. A second layer of structurally continuous Co—Pt with no pinning sites and having a thickness of 3 to 6 nanometers is deposited on top of the first granular layer. The two layers are magnetically coupled by interlayer exchange coupling. Muraoka et al. disclose that the CGC media show reduced transition jitter due to the interlayer exchange coupling between the granular magnetic layer and the continuous layer.

U.S. Pat. No. 6,716,516 (Futamoto et al.) discloses a perpendicular magnetic recording medium that includes tow perpendicular magnetization films having different magnetic anisotropy constants. A first perpendicular magnetization film is a granular layer of a Co-based alloy containing at least one element selected from Cr, Ta, Pt, Pd, Si, V, Nb, W, Mo, Hf, Re, Zr, B, P and Ru. A second perpendicular magnetization film is deposited on the first film and is either: i) a multi-layered perpendicular magnetization film of CoPt, CoPd or alloys thereof; or ii) an amorphous perpendicular magnetization film, such as TbFeCo containing rare-earth elements. The second film has a greater magnetic anisotropy in the perpendicular direction than the first film. Futamoto et al. disclose that the medium has reduced noise due to strong exchange coupling in the longitudinal direction of the second film, which reduces reverse magnetic domains and microscopic instability that is typically present at the surface of the first film.

U.S. Pat. No. 6,794,028 (Uwazumi et al.) discloses perpendicular magnetic recording media that include two magnetic layers. A first lower magnetic layer is made from CoCr magnetic grains and non-magnetic grain boundaries of oxides or nitrides. A second upper magnetic layer having high anisotropy includes an amorphous alloy of a transition metal selected from Ni, Fe and Co and a rare earth element selected from Pr, Nd, Gd, Tb, Dy, and Ho in a concentration of from 10 at. % to 35 at. %. A perpendicular magnetic recording medium having the disclosed structure exhibits favorable electromagnetic conversion characteristics under a high recording density condition and excellent thermal stability.

U.S. Pat. No. 6,183,893 by Futamoto et al. discloses a perpendicular magnetic recording medium that includes a magnetized film with a bilayer structure. In one embodiment, Futamoto et al. disclose that an upper layer of the magnetized film, which can be hetero-epitaxially grown on the lower layer, has a lower concentration of nonmagnetic elements than a lower layer of the magnetized film. Additionally, the saturation magnetization ($M_s$) and magnetic anisotropy ($K_u$) of the upper layer are larger than the lower layer. Futamoto et al. disclose that the media exhibits reduced noise.

There remains a need for improved perpendicular recording media having improved signal-to-noise ratio (SNR), transition jitter, resolution and thermal stability.

SUMMARY OF THE INVENTION

According to the present invention, a perpendicular magnetic recording medium comprising a high magnetization ($M_s$) and low anisotropy ($K_u$) capping layer is provided for the purpose of improving resolution, SNR, and thermal stability. The recording medium with a high $M_s$ capping layer can reduce DC noise by introducing intergranular exchange coupling between the magnetic capping layer and underlying magnetic recording layers, which prevents small grains in the magnetic recording layer from magnetization reversals, while low transition jitter is maintained by the well isolated Co grains with high $K_u$.

According to one embodiment, a perpendicular recording medium is provided. The perpendicular recording medium includes a substrate, a soft magnetic underlayer disposed over the substrate, a perpendicular magnetic recording layer disposed over the soft magnetic underlayer, where the magnetic recording layer including magnetic grains and a non-magnetic grain boundary phase, and a magnetic capping layer disposed over the perpendicular magnetic recording layer. The magnetic capping layer has a lower magnetic anisotropy ($K_u$) than the perpendicular magnetic recording layer.

According to one aspect of this embodiment of the present invention, the magnetic capping layer is a Co alloy, and preferably is a single layer of a Co alloy. The Co alloy can include additional elements and can be comprised of CoCrTa or CoPtCrB. According to one aspect, the magnetic capping layer is a granular layer, i.e., the magnetic capping layer is a structurally discontinuous layer. For example, the magnetic capping layer can be grown epitaxially on the perpendicular magnetic recording layer. According to another aspect, the magnetic capping layer has a saturation magnetization that is higher than the saturation magnetization of the perpendicular magnetic recording layer. According to one aspect, the magnetic capping layer has a saturation magnetization of at least about 200 emu/cm$^3$ and more preferably a saturation magnetization of at least about 400 emu/cm$^3$.

According to another aspect, the perpendicular magnetic recording layer and the magnetic capping layer are magnetically exchange coupled. Accordingly, the magnetic capping layer substantially prevents grains in the perpendicular magnetic recording layer that are smaller than an average grain size from experiencing magnetization reversals. According to one aspect, the magnetic grains include a CoCr alloy, such as a CoCrPt alloy. The grain boundary phase can be an oxide phase, such as a Cr-oxide phase. According to one aspect, the magnetic grains have an average grain size of not greater than about 10 nanometers, such as from about 5 nanometers to about 7 nanometers. The capping layer can also have a lower thermal stability factor ($K_uV$) than the perpendicular magnetic recording layer.

According to another embodiment of the present invention, a perpendicular recording medium is provided that includes a substrate, a soft magnetic underlayer disposed over the substrate, a perpendicular magnetic recording layer disposed over the soft magnetic underlayer, where the magnetic recording layer includes a CoCr alloy, magnetic grains separated by a grain boundary phase comprising an oxide, such as Cr-oxide, and a magnetic capping layer disposed over the perpendicular magnetic recording layer, where the capping layer includes a high saturation magnetization ($M_s$) and a lower magnetic anisotropy ($K_u$) than the perpendicular magnetic recording layer.

According to another embodiment, a perpendicular recording medium is provided that includes a substrate, a soft magnetic underlayer disposed over the substrate, a perpendicular magnetic recording layer disposed over the soft magnetic underlayer, where the magnetic recording layer includes a CoCr alloy magnetic grains separated by a grain boundary phase comprising Cr-oxide, and a capping layer including a single layer of a CoCr alloy disposed over the perpendicular magnetic recording layer.

DESCRIPTION OF THE INVENTION

The present invention is directed to a magnetic recording medium including a perpendicular magnetic recording layer. As used herein, a perpendicular magnetic recording layer is a magnetic recording layer where the magnetic grains have an easy magnetization axis that is oriented substantially perpendicular to the plane of the layer (i.e., the radial axis). The magnetic recording medium can be, for example, a magnetic tape or a magnetic hard disk, and in a preferred embodiment is a magnetic hard disk, such as for use in a disk drive.

Figure 1:
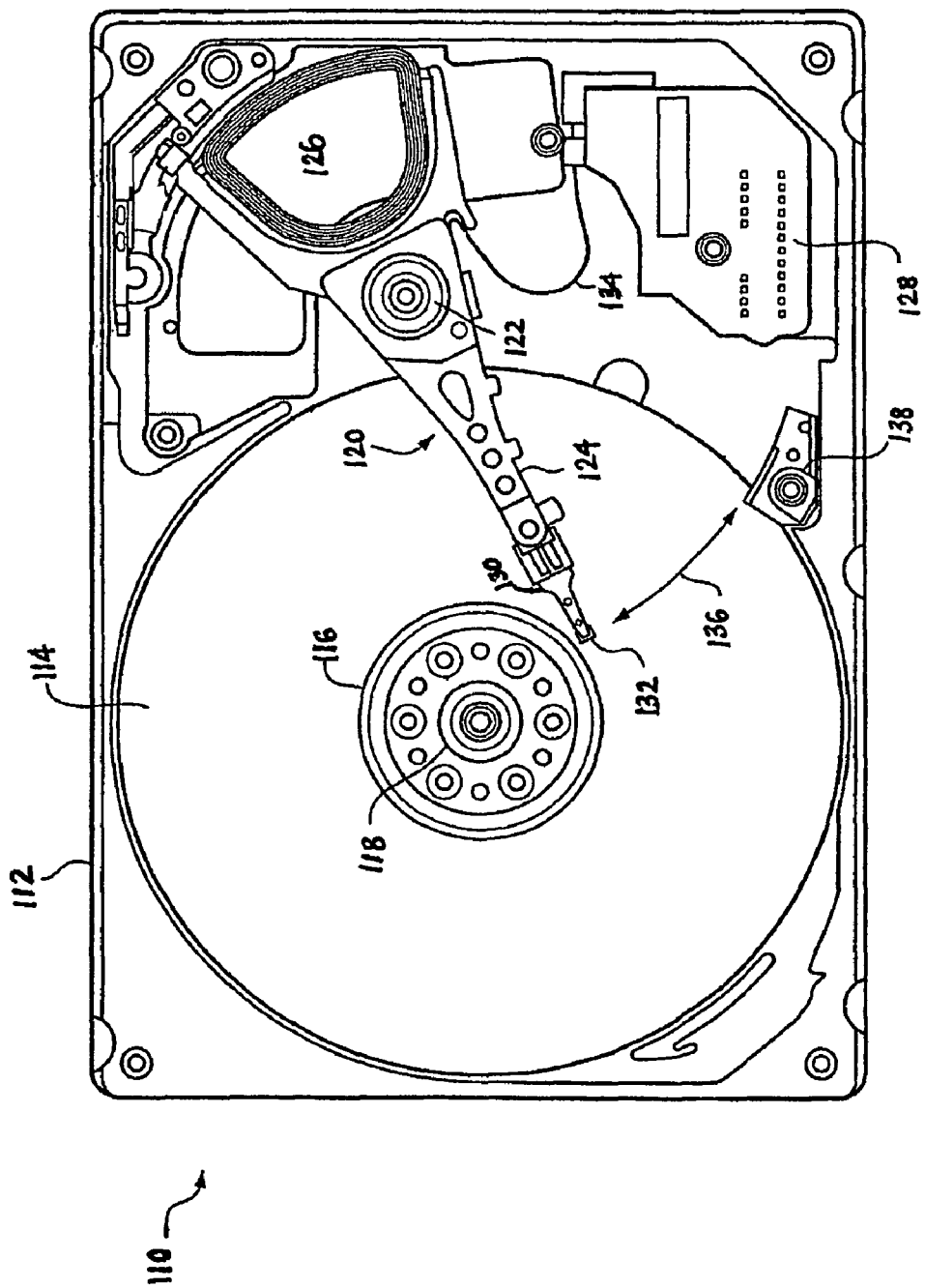
FIG. 1 illustrates a top or plan view of one embodiment of a disk drive device.

The present invention is particularly applicable to magnetic recording disks, such as those useful in a disk drive device. By way of example, FIG. 1 illustrates one embodiment of a disk drive 110. The disk drive 110 generally includes a base plate 112 and a cover (not shown) that may be disposed on the base plate 112 to define an enclosed housing or space for the various disk drive components. The disk drive 110 includes one or more data storage disks 114 of any appropriate computer-readable data storage media. Typically, both of the major surfaces of each data storage disk 114 include a plurality of concentrically disposed tracks for data storage purposes. Each disk 114 is mounted on a hub or spindle 116, which in turn is rotatably interconnected with the disk drive base plate 112 and/or cover. Multiple data storage disks 114 are typically mounted in vertically spaced and parallel relation on the spindle 116. Rotation of the disk(s) 114 is provided by a spindle motor 118 that is coupled to the spindle 116 to simultaneously spin the data storage disk(s) 114 at an appropriate rate.

The disk drive 110 also includes an actuator arm assembly 120 that pivots about a pivot bearing 122, which in turn is rotatably supported by the base plate 112 and/or cover. The actuator arm assembly 120 includes one or more individual rigid actuator arms 124 that extend out from near the pivot bearing 122. Multiple actuator arms 124 are typically disposed in vertically spaced relation, with one actuator arm 124 being provided for each major data storage surface of each data storage disk 114 of the disk drive 110. Other types of actuator arm assembly configurations could be utilized as well, such as an "E" block having one or more rigid actuator arm tips or the like that cantilever from a common structure. In any case, movement of the actuator arm assembly 120 is provided by an actuator arm drive assembly, such as a voice coil motor 126 or the like. The voice coil motor 126 is a magnetic assembly that controls the operation of the actuator arm assembly 120 under the direction of control electronics 128. Any appropriate actuator arm assembly drive type may be utilized by the disk drive 110, including a linear drive (for the case where the actuator arm assembly 120 is interconnected with the base plate 112 and/or cover for linear movement versus the illustrated pivoting movement about the pivot bearing 122) and other types of rotational drives.

A load beam or suspension 130 is attached to the free end of each actuator arm 124 and cantilevers therefrom. Typically, the suspension 130 is biased generally toward its corresponding disk 114 by a spring-like force. A slider 132 is disposed at or near the free end of each suspension 130. What is commonly referred to as the read/write head (e.g., transducer) is appropriately mounted on the slider 132 and is used in disk drive read/write operations.

The head on the slider 132 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two (or more) magnetic layers. The typical use in recording heads is the spin valve device that uses a pinned magnetic layer and a free layer to detect external fields. The normalized change in on-wafer resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by an insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The read/write head of the present invention is discussed in further detail below. The biasing forces exerted by the suspension 130 on its corresponding slider 132 moves the slider 132 in the direction of its corresponding disk 114. Typically, this biasing force is such that if the slider 132 were positioned over its corresponding disk 114, without the disk 114 being rotated at a sufficient velocity, the slider 132 would be in contact with the disk 114.

The head on the slider 132 is connected to a preamplifier 133, which is interconnected with the control electronics 128 of the disk drive 110 by a flex cable 134 that is typically mounted on the actuator arm assembly 120. Signals are exchanged between the head and its corresponding data storage disk 114 for disk drive read/write operations. In this regard, the voice coil motor 126 is utilized to pivot the actuator arm assembly 120 to simultaneously move the slider 132 along a path 136 and "across" the corresponding data storage disk 114 to position the head at the desired/required radial position on the disk 114 (i.e., at the approximate location of the correct track on the data storage disk 114) for disk drive read/write operations.

When the disk drive 110 is not in operation, the actuator arm assembly 120 is pivoted to a "parked position" to dispose each slider 132 generally at or beyond a perimeter of its corresponding data storage disk 114, but in any case in vertically spaced relation to its corresponding disk 114. This is commonly referred to in the art as being a dynamic load/unload disk drive configuration. In this regard, the disk drive 110 includes a ramp assembly 138 that is disposed beyond a perimeter of the data storage disk 114 to typically both move the corresponding slider 132 vertically away from its corresponding data storage disk 114 and to also exert somewhat of a retaining force on the actuator arm assembly 120. Any configuration for the ramp assembly 138 that provides the desired "parking" function may be utilized. The disk drive 110 could also be configured to be of the contact start/stop type, where the actuator arm assembly 120 would pivot in a direction to dispose the slider(s) 132 typically toward an inner, non-data storage region of the corresponding data storage disk 114. Terminating the rotation of the data storage disk(s) 114 in this type of disk drive configuration would then result in the slider(s) 132 actually establishing contact with or "landing" on its corresponding data storage disk 114, and the slider 132 would remain on the disk 114 until disk drive operations are re-initiated.

The slider 132 of the disk drive 110 may be configured to "fly" on an air bearing during rotation of its corresponding data storage disk(s) 114 at a sufficient velocity. The slider 132 may be disposed at a pitch angle such that its leading edge is disposed further from its corresponding data storage disk 114 than its trailing edge. The read/write head would typically be incorporated on the slider 132 generally toward its trailing edge since this is positioned closest to its corresponding disk 114. Other pitch angles/orientations could also be utilized for flying the slider 132.

Figure 2:
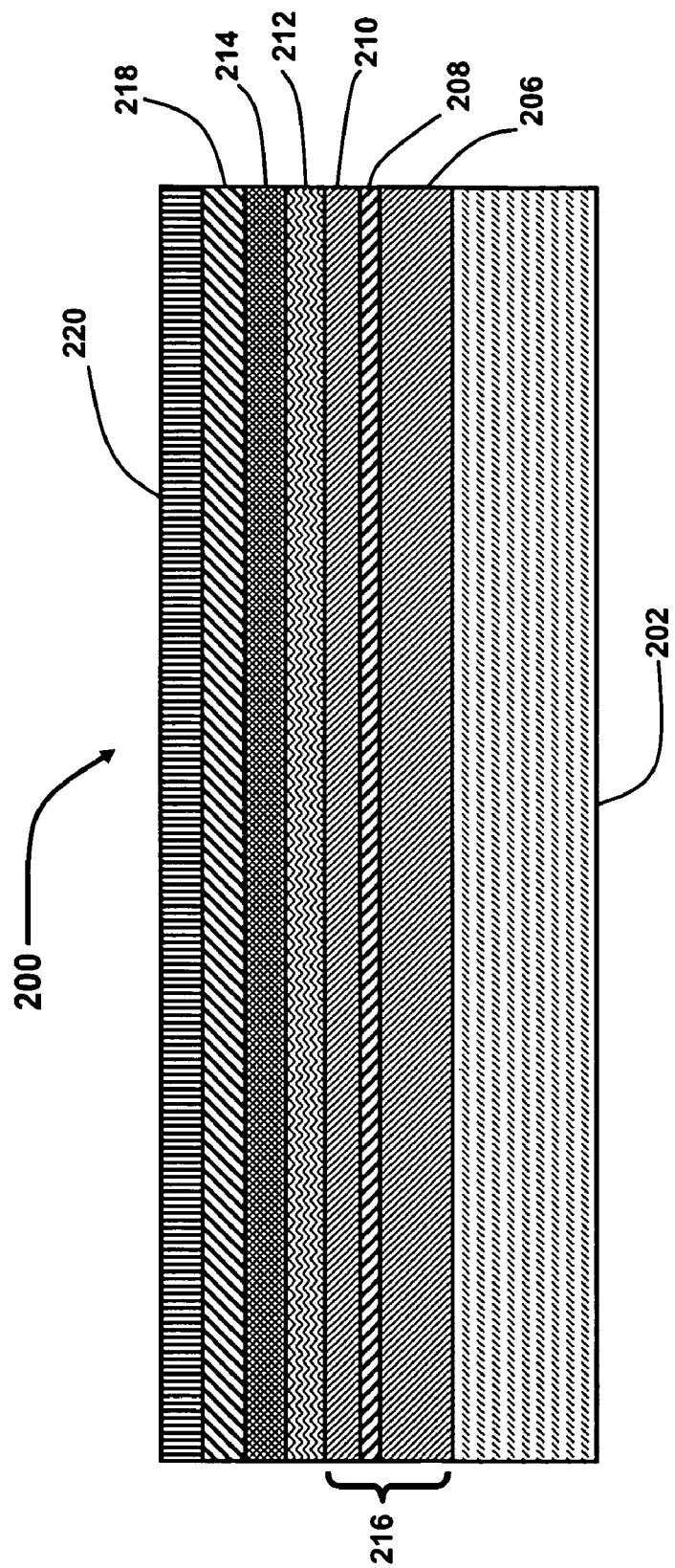
FIG. 2 illustrates a cross-section of a magnetic recording medium according to an embodiment of the present invention.

The present invention is directed to perpendicular recording medium, such as one that is useful in a disk drive device as illustrated in FIG. 1. The perpendicular recording medium can include a perpendicular magnetic recording layer and a magnetically soft underlayer disposed beneath the magnetic recording layer. FIG. 2 illustrates a cross-sectional view of a perpendicular magnetic recording medium according to an embodiment of the present invention that is useful in a disk drive device. The magnetic recording medium 200 includes multiple material layers that are deposited upon a rigid substrate 202. Among the layers disposed on the rigid substrate 202 is a perpendicular magnetic recording layer 218. Disposed between the substrate 202 and the perpendicular magnetic recording layer 218 is a magnetically soft underlayer structure 216. A magnetically soft underlayer serves as a magnetic flux return path that is desirable for perpendicular magnetic recording. Disposed between the soft underlayer structure 216 and the perpendicular magnetic recording layer 218 are one or more intermediate layer(s). According to the present invention, a magnetic capping layer 220 is disposed over the perpendicular magnetic recording layer 218.

The rigid substrate 202 can be fabricated from a number of materials known to those skilled in the art to be useful for magnetic recording media such as hard disks. A particularly preferred material for the rigid substrate 202 according to the present invention is aluminum (Al) coated with a layer of nickel phosphorous (NiP). However, it will be appreciated that the rigid substrate can also be fabricated from other materials, such as glass and glass-containing materials, including glass-ceramics. The rigid substrate 202 typically has an average thickness in the range of from about 10 mils to about 75 mils (about 0.254 millimeter to 1.9 millimeter) and has a smooth surface upon which the remaining layers can be deposited.

A magnetically soft underlayer is disposed over the substrate 202. As illustrated in FIG. 2, a soft underlayer structure 216 comprises a first soft magnetic underlayer 206 deposited over the substrate 202, a non-magnetic spacer 208 deposited over the first soft underlayer 206, and a second magnetically soft underlayer 210 deposited over the non-magnetic spacer 208. The soft underlayers 206 and 210 have a high permeability and a low coercivity. Preferably, the soft magnetic layers have a coercivity of not greater than about 10 oersteds (Oe) and a magnetic permeability of at least about 50. For example, the magnetically soft underlayers can be fabricated from soft magnetic materials such as CoZrNb, CoZrTa, FeCoB and FeTaC. The magnetically soft underlayers 206 and 210 can be fabricated from the same magnetically soft material, or from different magnetic materials.

The spacer layer 208 is fabricated from a non-magnetic material. Examples of non-magnetic materials include ruthenium (Ru), rhenium (Re), rhodium (Rh), chromium (Cr) and copper (Cu). Preferably, the spacer layer 208 is fabricated from Ru. The thickness of the non-magnetic spacer layer 208 is preferably selected to provide antiferromagnetic coupling between the two soft underlayers 206 and 210. According to one embodiment, the thickness of the spacer layer can be from about 0.5 nanometers to about 2 nanometers, such as about 0.8 nanometers.

Preferably, the first soft underlayer 206 (closest to the substrate) has an average thickness that is greater than the average thickness of the second soft underlayer 210. For example, the thickness of the second soft underlayer 210 can be from about 10 percent to about 40 percent of the total thickness of the soft underlayer structure 216, which preferably has a total thickness of from about 50 nanometers to about 300 nanometers. For example, the thickness of the first soft underlayer can be from about 120 to 160 nanometers and the thickness of the second soft underlayer can be from about 10 nanometers to about 40 nanometers.

Although illustrated as having a multi-layer soft underlayer structure, the present invention is also applicable to magnetic recording media having other soft underlayer structures, such as a single magnetically soft underlayer.

Disposed over the soft underlayer structure 216 is one or more intermediate layer(s). The total thickness of the intermediate layer(s) can preferably be from about 2 to about 50 nanometers. The intermediate layer can preferably be fabricated from materials that are non-magnetic, such as, for example, Ru, Cr, Ta, Ni, Al or other alloys that result in a non-magnetic layer that imparts good growth properties to the perpendicular magnetic recording layer 218. According to a preferred embodiment, the intermediate layer comprises two distinct sub-layers, such as a seedlayer 212 of Ta, Ti or their alloys and having a thickness of from about 1 to 3 nanometers and an adjacent Ru or Ru alloy (e.g., RuCr) sub-layer 214 having a thickness of from about 5 to about 40 nanometers, with the Ru or Ru alloy layer being disposed between the magnetic recording layer 218 and the lower sub-layer, preferably coupled (i.e., in direct contact with) the magnetic recording layer 218.

The perpendicular magnetic recording layer 218 is deposited over the intermediate layer(s). The magnetic recording layer 218 has an easy magnetization axis (e.g., the c-axis) that is oriented substantially perpendicular to the surface of the magnetic recording layer 218. Useful materials for the magnetic recording layer 218 include cobalt-based alloys having a hexagonal close packed (hcp) structure. Cobalt can be alloyed with elements such as chromium (Cr), platinum (Pt), boron (B), niobium (Nb), tungsten (W) and tantlum (Ta).

In a preferred embodiment, the magnetic recording layer 218 includes cobalt alloyed with chromium (CoCr). As used herein, the term CoCr alloys can include alloys having other components in addition to Co and Cr. For example, a CoCr alloy can also include platinum (CoCrPt) and the CoCrPt alloy can include other elements such as boron (CoCrPtB).

The magnetic recording layer most preferably comprises an oxide, such as a CoCrPt-oxide or a CoCrPtB-oxide. Such oxides can further include silicon (Si), such as a CoCrPtSi-oxide or a CoCrPtBSi-oxide. The structure of these oxide-containing materials will consist of magnetic Co grains with a non-magnetic oxide phase, such as $CrO_x$, present in the grain boundaries. The grain boundary phase is typically amorphous (non-crystalline).

The magnetic recording layer 218 is composed of magnetic grains separated by a non-magnetic grain boundary phase. Preferably, the magnetic grains have an average size (i.e., diameter) of not greater than about 10 nanometers, and more preferably not greater than about 7 nanometers, and even more preferably not greater than about 6 nanometers. Preferably, the average magnetic grain size is at least about 5 nanometers, and in one embodiment, the average grain size is from about 5 nanometers to about 7 nanometers. The magnetic recording layer 218 preferably has an average thickness of at least about 1 nanometer, such as from about 15 nanometers to about 30 nanometers, more preferably from about 15 nanometers to about 25 nanometers.

According to the present invention, a magnetic capping layer 220 is disposed over and is physically coupled to the perpendicular magnetic recording layer 218. The magnetic capping layer 220 and the perpendicular magnetic recording layer 218 are magnetically exchange coupled, whereby the magnetic capping layer 220 reduces magnetic reversals of magnetic grains in the magnetic recording layer 218 that are smaller than the average grain size in the magnetic recording layer 218.

The magnetic capping layer 220 is preferably fabricated from a Co alloy that comprises at least about 50 at. % Co, preferably a CoCr alloy such as CoCrTa or CoCrPtB. Preferably, the magnetic capping layer 220 according to the present invention is a structurally discontinuous (i.e., granular) layer that preferably is epitaxially grown on the perpendicular magnetic recording layer 218. To maintain a crystalline structure, it is preferred that the magnetic capping layer alloy be substantially free of rare-earth metals, such as Tb and Gd, that can form an amorphous alloy. Preferably, the magnetic capping layer has a lower magnetic anisotropy ($K_u$) than the perpendicular magnetic recording layer. Further, the thermal stability factor ($K_uV$, where V is the magnetic activation volume) of the magnetic capping layer is preferably lower than the $K_uV$ of the perpendicular magnetic recording layer. According to one embodiment, the $K_uV$ of the magnetic capping layer 220 is not greater than about 20% of the $K_uV$ of the perpendicular magnetic recording layer. Further, the saturation magnetization ($M_s$) of the magnetic capping layer 220 is preferably higher than that of the perpendicular magnetic recording layer 218. In one embodiment, the magnetic capping layer 220 has a $M_s$ of at least about 200 emu/cm$^3$, more preferably at least about 400 emu/cm$^3$ and even more preferably at least about 600 emu/cm$^3$, and even more preferably at least about 750 emu/cm$^3$. In one embodiment, the $M_s$ of the magnetic capping layer is from about 400 emu/cm$^3$ to about 1000 emu/cm$^3$, such as from about 750 to 1000 emu/cm$^3$. The thickness of the magnetic capping layer 220 is preferably less than the thickness of the magnetic recording layer 218, and is preferably at least about 5 angstroms and preferably is not greater than about 50 angstroms.

The perpendicular magnetic recording medium 200 can also include a non-magnetic protective layer (not illustrated) such as a protective carbon layer disposed over and physically coupled with the magnetic capping layer 220, and can also include a lubricant layer disposed over the protective layer. These layers are adapted to reduce damage from the read/write head interactions with the recording medium during start/stop operations. Such layers are disclosed, for example, in U.S. Pat. No. 6,875,492 by Pirzada et al., which is incorporated herein by reference in its entirety. According to a preferred embodiment, a non-magnetic protective layer is disposed on the magnetic capping layer, where the magnetic capping layer is a single layer disposed on the magnetic recording layer.

The layers of the magnetic recording media according to the present invention can be deposited on the substrate using known deposition techniques. For example, the deposition of the layers under the substrate can be accomplished by physical vapor deposition, e.g., sputtering. Sputtering can be accomplished using gases such as Ar, Kr or Xe. Oxygen can be included in the sputtering gas (reactive sputtering) to form an oxide phase for the magnetic recording layer. For the underlayer and the magnetic recording layer, it is preferred to sputter at a pressure of from about 2 mTorr to about 150 mTorr. The substrate can be heated prior to sputtering and can be annealed after one or more of the layers has been deposited to relieve residual stresses.

DC noise in CoPtCrO media may originate from thermally unstable small grains. For CoPtCrO media with $\alpha=1.3$, the average grain diameter <D> is 6 nm and the standard deviation-to-average grain diameter $\sigma$/<D> is 20%, with a substantial amount of grains in the range of 2.5 to 4 nm, which can be a source of DC noise.

Figure 3:
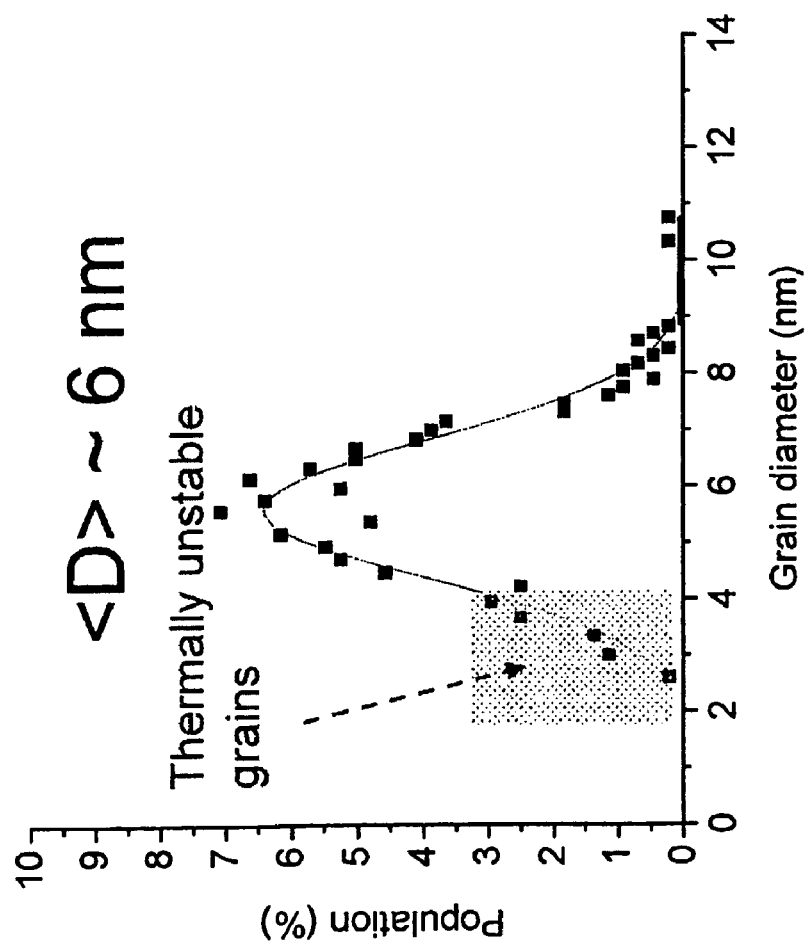
FIG. 3 illustrates the grain size distribution of a perpendicular magnetic recording layer in a magnetic recording medium.

FIG. 3. illustrates the grain size distribution for a magnetic recording layer have an average grain diameter of about 6 nanometers. As is illustrated in FIG. 3, the magnetic recording layer having an average grain diameter of about 6 nanometers includes a significant number of grains having a size of less than 4 nanometers which are thermally unstable. These thermally unstable grains can become magnetically pinned to a preferred orientation through indirect coupling to a larger, adjacent magnetic grain. This can result in degraded magnetic properties.

Figure 4:
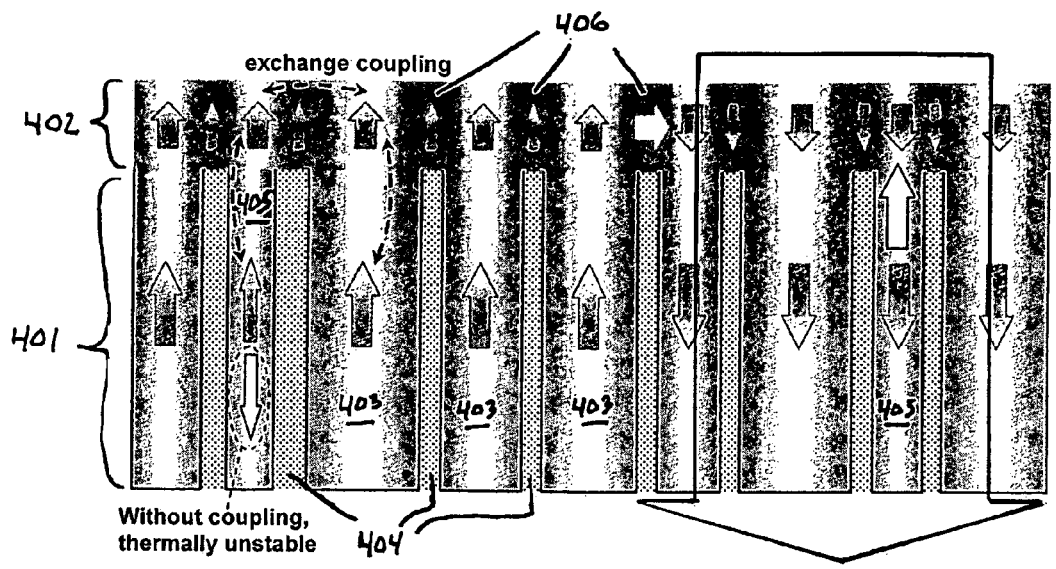
FIG. 4 illustrates a magnetic recording layer and magnetic capping layer according to an embodiment of the present invention.

FIG. 4 schematically illustrates the magnetic interaction of a granular perpendicular magnetic recording layer 401 and a magnetic capping layer 402. The grain boundaries 406 in the capping layer 402 grow on the amorphous grain boundaries 404 of the magnetic recording layer 401. These grain boundaries 406 do not have perpendicular anisotropy and therefore the transition position is determined by the granular magnetic recording layer 401. The capping layer 402 provides adequate in-plane exchange coupling and inter-layer exchange coupling between granular magnetic recording grains 403 and capping layer grains. The larger magnetic grains 403 are thermally stable, whereas the smaller magnetic grains 405 are thermally unstable if they are not magnetically coupled. This structure is distinct from CGC media comprising a magnetically and structurally continuous capping layer.

The perpendicular magnetic recording media with a magnetic capping layer having a high $M_s$ can reduce DC noise by introducing intergranular exchange coupling between the magnetic capping layer and the perpendicular magnetic recording layer(s), which prevents small magnetic grains from magnetization reversal, while low transition jitter is maintained by the well isolated magnetic Co grains with high $K_u$.

The magnetic recording media of the present invention can potentially offer high tolerance of grain size distribution and anisotropy orientation dispersion. Moreover, the continuous coverage of a Co-based alloy capping layer onto an oxide-containing perpendicular magnetic recording layer can improve corrosion resistance, which is critical for long-term reliability.

EXAMPLES

In the following examples, media are formed by depositing material layers onto NiP-plated aluminum substrates using an Intevac MDP250B system. Ta/Ru is used as an intermediate layer. CoPtCrO magnetic recording layers are dc-magnetron sputtered using an oxygen-doped CoPtCr target. Two CoPtCrO alloys with an $M_s$ of 330 and 390 emu/cm$^3$ are used as the magnetic recording layers. Their combined thicknesses and magnetic coercivities ($H_c$) are 14 to 17 nanometers and 4 to 5 kOe without a magnetic capping layer. Various Co-alloy capping layers with $M_s$ in the range of 190 emu/cm$^3$ to 900 emu/cm$^3$ are deposited onto the CoPtCrO magnetic recording layer. The soft magnetic underlayer is made of two antiferromagnetically coupled layers of CoZrTa with a total thickness of 85 nm.

The magnetic capping layer with an $M_s$ of 190 emu/cm$^3$ has a higher concentration of Cr and B (non-magnetic elements) than the magnetic capping layer with higher $M_s$ values, resulting in a more segregated grain structure with weaker inter-granular exchange coupling. For comparison, highly exchange-coupled amorphous (i.e., continuous) TbFeCo having an $M_s$ of about 150 emu/cm$^3$ is also used for magnetic capping layer. A 5 nm-thick TbFeCo film shows an $H_c \geq 10$ kOe with a perpendicular anisotropy $K_u$ of about $3.5 \times 10^6$ erg/cm$^3$.

Grain morphology is investigated by transmission electron microscopy (TEM). The crystallographic orientation of the Ru and Co (00.2) c-axis is measured by x-ray diffraction (XRD). Magnetic properties are measured by a vibrating sample magnetometer (VSM) and a magneto-optical polar Kerr magnetometer. Recording performance is evaluated on a Guzik tester with a shielded pole writer and a giant magnetoresistance reader.

For all the CoPtCrO composite media, excellent Co (00.2) c-axis orientation dispersion is achieved with the XRD rocking curve $\Delta\theta_{50}=3°$. This $\Delta\theta_{50}$ is similar to that of the CoPtCrO layer while the XRD (00.2) peak intensity increases with increasing magnetic capping layer thickness, indicating that the magnetic capping layer is growing epitaxially on the CoPtCrO layer.

Figure 5:
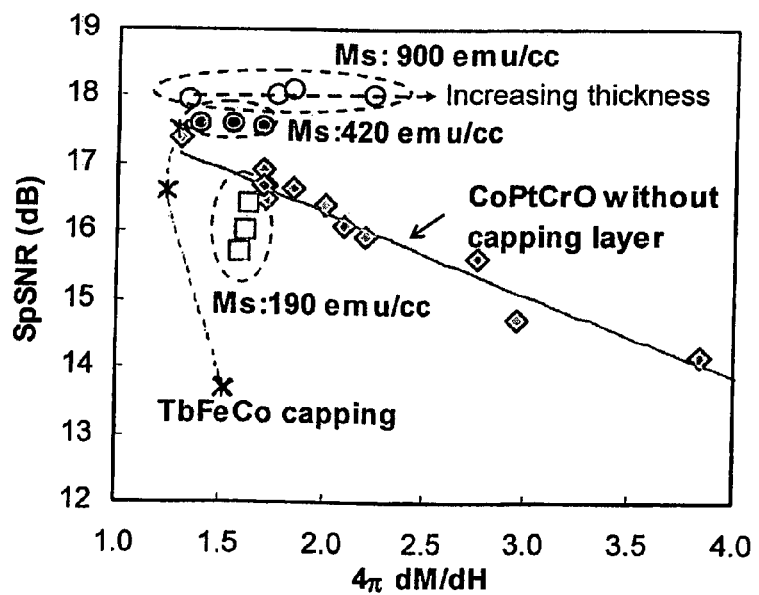
FIG. 5 illustrates the change in spectral signal-to-noise ratio (SpSNR) as a function of magnetization loop slope for media according to the present invention and compared to the prior art.

FIG. 5 illustrates the change in spectral signal-to-total noise-ratio (SpSNR, where 2T=370 kfci) as a function of the magnetization loop slope, $\sigma=4\pi \cdot (dM/dH)_{Hc}$, for media with and without a magnetic capping layer. The exchange coupling strength can be represented by the magnetization loop slope ($\alpha$) when the anisotropy dispersion and the magnetostatic field of the magnetic Co grains remain constant. The circled groups in FIG. 5 indicate CoPtCrO media with Co-alloy capping layers with different $M_s$.

As shown in FIG. 5, for CoPtCrO media ($M_r t=0.55$ memu/cm$^2$) without a capping layer, the SpSNR decreases sharply with increasing $\alpha$. For CoPtCrO media having magnetic capping layers, the SpSNR is strongly affected by the $M_s$ of the magnetic capping layer. Magnetic capping layers with an $M_s$ of 420 emu/cm$^3$ and 900 emu/cm$^3$ enhance SpSNR, but the capping layer with an $M_s$ of 190 emu/cm$^3$ and a continuous TbFeCo alloy degrades the SpSNR. For the media of the present invention having a magnetic capping layer with $M_s$=900 emu/cm$^3$, the SpSNR remains unaffected by an $\alpha$ value ranging from 1.3 to 2.2, implying that the increased exchange-coupling does not contribute to the noise, in contrast to the media without a magnetic capping layer.

Figure 6:
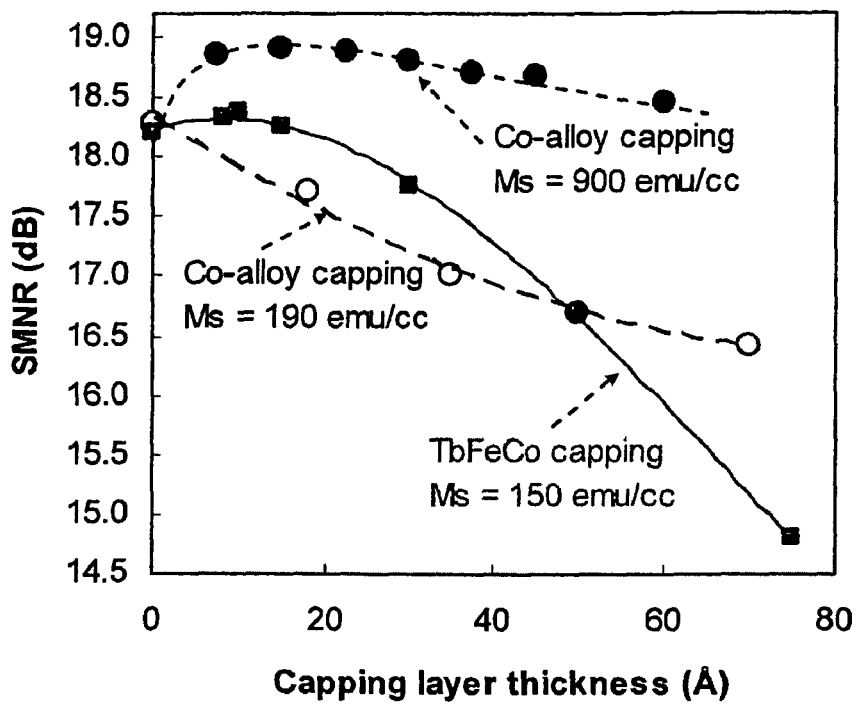
FIG. 6 illustrates the effect of magnetic capping layer thickness on SMNR for media according to the present invention and compared to the prior art.

FIG. 6 illustrates the effect of magnetic capping layer thickness on the media SMNR (SMNR=SpSNR without the head and circuit noise) of CoPtCrO media with different magnetic capping layers. The CoPtCrO layer with $\alpha=1.3$, $H_c$ of about 4.1 kOe, $M_s$ of 330 emu/cm$^3$ and negative nucleation field ($H_n$=−1 kOe), is used as a recording layer prior to depositing the magnetic capping layer due to its excellent SpSNR performance as illustrated in FIG. 5. For the media with a magnetic capping layer having an $M_s$ of about 190 emu/cm$^3$, the $H_c$ and $H_n$ remain unaffected as compared to the CoPtCrO recording layer, but the SMNR decreases sharply with increasing thickness of the magnetic capping layer. For the media with a magnetic capping layer having an $M_s$ of about 900 emu/cm$^3$, the SMNR increases significantly with a capping layer as thin as 1 nanometer and continues to be higher than that of the CoPtCrO media without a magnetic capping layer.

Magnetic capping layers having a high $M_s$ improve resolution by reducing effective magnetic spacing. For media with a 2 nanometer thick magnetic capping layer, the resolution (2T/6T) is 79% for a magnetic capping layer having an $M_s$ of 900 emu/cm$^3$, but 74.5% for a magnetic capping layer having an $M_s$ of 190 emu/cm$^3$. For the media with a highly exchange-coupled continuous TbFeCo alloy as a magnetic capping layer, the SMNR remains constant with TbFeCo layer thickness to 1.8 nanometer but decreases sharply with further increasing thickness. The $H_n$ of CoPtCrO composite media with TbFeCo capping layer continues to increase with increasing capping layer thickness, indicating that TbFeCo layer with high $K_u$ and $H_n$ is exchange-coupled to the CoPtCrO layer. Unlike CGC media reported earlier, a continuous TbFeCo capping layer appears to increase media noise.

Figure 7:
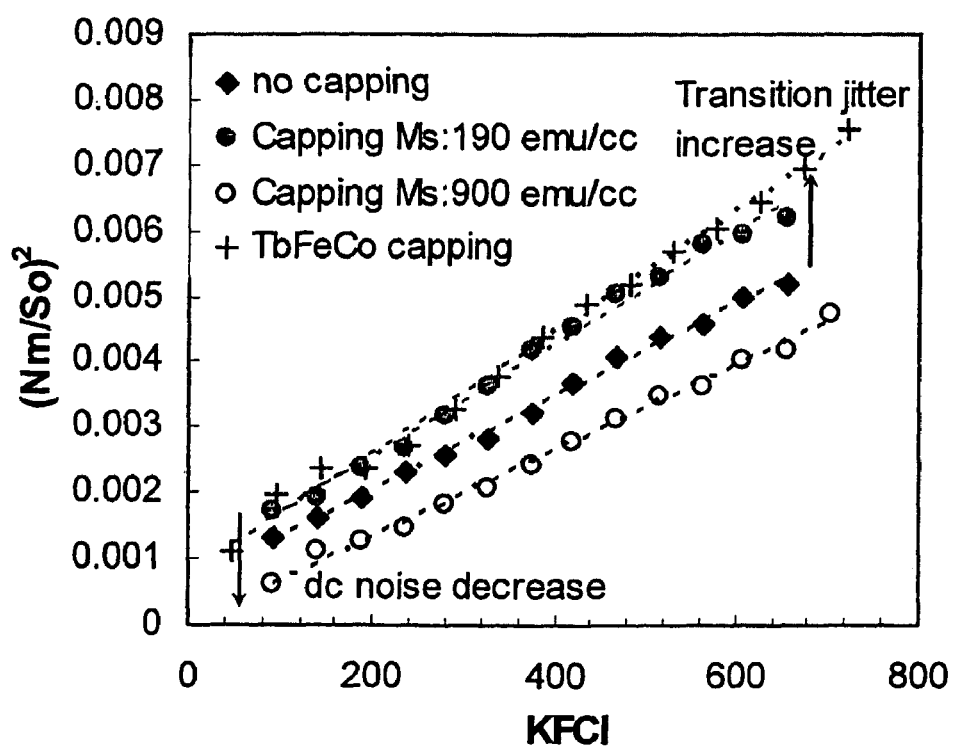
FIG. 7 illustrates the linear density dependence of the normalized noise power for magnetic recording media with different magnetic capping layers and compared to the prior art.

In order to further investigate the media noise characteristics, the linear density dependence of the normalized noise power $(N_m/S_o)^2$ is studied for magnetic recording media with different magnetic capping layer thickness. FIG. 7 illustrates the linear density dependence of $(N_m/S_o)^2$ for media with different magnetic capping layers and no magnetic capping layer. The media with a capping layer having a $M_s$ of 190 emu/cm$^3$ or a TbFeCo magnetic capping layer exhibit significantly higher media noise power and steeper slope with kfci than the media without capping or with $M_s$=900 emu/cm$^3$ capping layer. For the media with $M_s$=900 emu/cm$^3$ capping layer, the slope of the noise power is similar to that of the media without a magnetic capping layer and does not change with increasing capping layer thickness, indicating that jitter is not induced by the exchange-coupled magnetic capping layer. Considering the increase of a with increasing capping layer thickness, this result is in contrast to the results with CoPtCrO media without capping layer where the transition jitter increases rapidly with increasing $\alpha$. It is, however, noted that a substantial DC noise reduction is achieved for the media with a magnetic capping layer having a high $M_s$, as indicated by the reduced magnitude of noise power curves extrapolating to 0 kfci.

In addition to improving the magnetic properties of the underlying magnetic recording layer, it is observed that the magnetic capping layer also can improve the corrosion resistance of the magnetic recording layer. Two media structures are prepared substantially as discussed above. Each of the media structures includes a soft underlayer and a Ta/Ru intermediate layer disposed above the soft underlayer. Each of the media structures also includes a magnetic recording layer of CoPtCrO. One of the media structures is fabricated according to the present invention where a CoPtCr magnetic capping layer was disposed over the magnetic recording layer.

Each of the magnetic recording media are stored at 80° C. and 80% relative humidity for 96 hours. The media are then dipped into deionized water for 20 minutes and high precision ion chromatography is used to analyze the amount of Co in the deionized water. The results are summarized in Table 1.

TABLE 1

| Media Structure | Co in DI Water (ng/cm$^3$) |
|---|---|
| SUL/Ta/Ru/CoPtCrO/CoPtCr | 1 to 9 |
| SUL/Ta/Ru/CoPtCrO | 43 to 100 |

The foregoing results indicate that the magnetic capping layer advantageously enhances the corrosion resistance of the media.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A perpendicular recording medium, comprising:
   a granular perpendicular magnetic recording layer comprising magnetic grains separated by a nonmagnetic grain boundary phase, wherein said grain boundary phase comprises an oxide; and
   a granular magnetic capping layer comprising a CoCr alloy, wherein said capping layer is disposed over and in direct contact with said perpendicular magnetic recording layer, wherein said capping layer is magnetically exchange coupled with the perpendicular magnetic recording layer, and wherein said capping layer has a lower magnetic anisotropy ($K_u$) than said perpendicular magnetic recording layer;
   wherein the capping layer has a thickness that is less than a thickness of the recording layer, and wherein the thickness of the capping layer is in a range from 5 to 50 angstroms.

2. A perpendicular recording medium as recited in claim 1, wherein said magnetic capping layer comprises a single layer of CoCr alloy.

3. A perpendicular recording medium as recited in claim 1, wherein said CoCr alloy comprises CoCrTa.

4. A perpendicular recording medium as recited in claim 1, wherein said CoCr alloy comprises CoPtCrB.

5. A perpendicular recording medium as recited in claim 1, wherein said magnetic capping layer is grown epitaxially on said perpendicular magnetic recording layer.

6. A perpendicular recording medium as recited in claim 1, wherein said magnetic capping layer has a saturation magnetization ($M_s$) that is higher than the saturation magnetization of said perpendicular magnetic recording layer.

7. A perpendicular recording medium as recited in claim 1, wherein said magnetic capping layer has a saturation magnetization of at least about 200 emu/cm$^3$.

8. A perpendicular recording medium as recited in claim 1, wherein said magnetic capping layer has a saturation magnetization of at least about 400 emu/cm$^3$.

9. A perpendicular recording medium as recited in claim 1, wherein said magnetic capping layer prevents grains in the perpendicular magnetic recording layer from magnetization reversals.

10. A perpendicular recording medium as recited in claim 1, wherein said CoCr alloy comprises CoCrPt.

11. A perpendicular recording medium as recited in claim 1, wherein said magnetic grains in said granular perpendicular magnetic recording layer have an average grain size of not greater than about 10 nanometers.

12. A perpendicular recording medium as recited in claim 1, wherein said magnetic grains in said granular perpendicular magnetic recording layer have an average grain size of from about 5 nanometers to about 7 nanometers.

13. A perpendicular recording medium as recited in claim 1, wherein said magnetic capping layer comprises a single layer, and wherein a non-magnetic protective layer is disposed on said magnetic capping layer.

14. A perpendicular recording medium as recited in claim 1, wherein said capping layer has a lower thermal stability factor (Ku V) than said perpendicular magnetic recording layer.

15. A perpendicular recording medium, comprising:
a granular perpendicular magnetic recording layer comprising CoCr alloy magnetic grains separated by an oxide grain boundary phase; and
a granular magnetic capping layer comprising a CoCr alloy, wherein said magnetic capping layer is disposed over and in direct contact with said perpendicular magnetic recording layer, wherein said capping layer is magnetically exchange coupled with the perpendicular magnetic recording layer, and wherein said capping layer comprises a higher saturation magnetization and a lower magnetic anisotropy than said perpendicular magnetic recording layer;
wherein the capping layer has a thickness that is less than a thickness of the recording layer, and wherein the thickness of the capping layer is in a range from 5 to 50 angstroms.

16. A perpendicular recording medium as recited in claim 15, wherein said CoCr alloy of the granular magnetic capping layer comprises CoCrTa.

17. A perpendicular recording medium as recited in claim 15, wherein said CoCr alloy of the granular magnetic capping layer comprises CoPtCrB.

18. A perpendicular recording medium as recited in claim 15, wherein said magnetic capping layer is grown epitaxially on said perpendicular magnetic recording layer.

19. A perpendicular recording medium as recited in claim 15, wherein said magnetic capping layer has a saturation magnetization of between about 400 emu/cm$^3$ and about 1000 emu/cm$^3$.

20. A perpendicular recording medium as recited in claim 15, wherein said magnetic capping layer has a saturation magnetization of at least about 750 emu/cm$^3$.

21. A perpendicular recording medium as recited in claim 15, wherein said magnetic capping layer prevents grains in the perpendicular magnetic recording layer from magnetization reversals.

22. A perpendicular magnetic recording medium as recited in claim 15, wherein said grain boundary oxide phase comprises Cr-oxide.

23. A perpendicular recording medium, comprising:
(a) a substrate;
(b) a soft magnetic underlayer disposed over said substrate;
(c) a perpendicular magnetic recording layer disposed over said soft magnetic underlayer, said magnetic recording layer comprising CoCr alloy magnetic grains separated by a grain boundary phase comprising Cr-oxide; and
(d) a granular capping layer comprising a CoCr alloy, wherein said capping layer is disposed over and in direct contact with said perpendicular magnetic recording layer, the capping layer consisting essentially of a single layer of a CoCr alloy, and wherein magnetic grains in said capping layer are magnetically exchange coupled with the magnetic grains in said perpendicular magnetic recording layer, and wherein said capping layer comprises a higher saturation magnetization and a lower magnetic anisotropy than said perpendicular magnetic recording layer;
wherein the capping layer has a thickness that is less than a thickness of the recording layer, and wherein the thickness of the capping layer is in a range from 5 to 50 angstroms.

24. A perpendicular recording medium as recited in claim 23, wherein said magnetic capping layer comprises a saturation magnetization of from about 400 emu/cm$^3$ to about 1000 emu/cm$^3$.

25. A perpendicular recording medium as recited in claim 23, wherein said recording medium further comprises a non-magnetic protective layer disposed on said capping layer.

* * * * *